(No Model.)

S. C. PITNEY & J. ASH.
HOE.

No. 343,606.  Patented June 15, 1886.

WITNESSES
Fred G. Dieterich
Robert F. McMillan

INVENTORS:
Sanford C. Pitney
Joseph Ash
per R. G. DuBois
their Attorney

UNITED STATES PATENT OFFICE.

SANFORD C. PITNEY AND JOSEPH ASH, OF QUINCY, ILLINOIS; SAID ASH ASSIGNOR TO MONROE ROBERTSON, OF BEVERLY, ILLINOIS.

HOE.

SPECIFICATION forming part of Letters Patent No. 343,606, dated June 15, 1886.

Application filed March 23, 1886. Serial No. 196,242. (No model.)

*To all whom it may concern:*

Be it known that we, SANFORD C. PITNEY and JOSEPH ASH, citizens of the United States, residing at Quincy, in the county of Adams and State of Illinois, have invented certain new and useful Improvements in Hoes; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention consists in an improved weed-hoe, wherein the cutting-blade is adjustable, in order that it may cut the weeds and earth at different angles.

Figure 1:
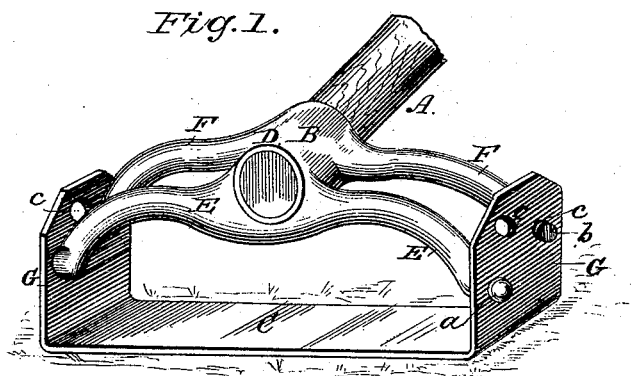
Figure 2:
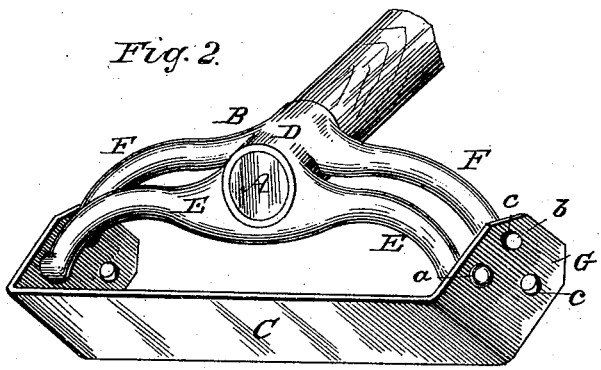
Figure 3:
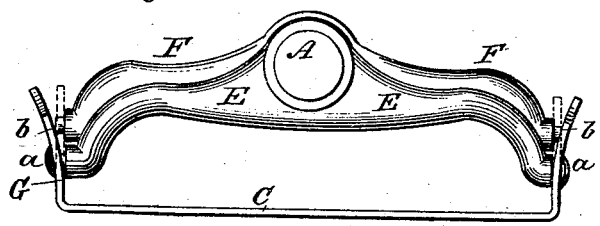

In the accompanying drawings, Figure 1 is a perspective view of the hoe. Fig. 2 is a similar view showing the cutting-blade in a different position, and Fig. 3 is an end view of the hoe.

Like letters designate corresponding parts in the different figures.

A is the handle of the hoe, to one end of which is secured the metallic hoe-head B, which carries the cutting-blade C. This head comprises a tubular sleeve or body, D, which slips over the handle of the hoe, from which body extend on both sides two branching arms, E F. These arms extend downwardly, so that when the hoe is held in an operative position their lower ends are below the plane of the body D, and the outer arms, E E, extend lower down than the inner arms, F F. The lower end of each outer arm E is formed with a projecting pivoting-lug, *a*, and the lower end of each inner arm F is formed with a locking-lug, *b*.

The cutting-blade C is made out of a thin flat piece of metal, and is formed with two side plates or flanges, G G, which are bent up out of the metal perpendicular to the blade C. Each of these flanges is formed with a suitable aperture near its outer edge and near its juncture with the blade, which aperture fits over the pivoting-lug *a* on the lower end of one of the outer arms E. By this means the blade is secured to the hoe-head, and at the same time it can turn on the lugs, the same serving as pivots for the blade, which can be locked in any angular position by means of a clasping device, which may be described as follows: Near its upper free edge each side of the plate is formed with a series of apertures, *c*. The apertures are each adapted to fit over the lug *b* on the lower end of one of the inner arms F. When the lugs *b* on each arm F are thus engaged by apertures on the side plates, the blade C is rigidly and securely held in position on the hoe-head. The side plates embrace the ends of the arms E F, and the blade extends across beneath the hoe-head in proper position for weeding purposes. When, however, it is desired to adjust the angular position of the blade, it is only necessary to free the side plates from the lugs *b* and to bring another set of apertures over them. The apertures being near the free ends of the side plates, G G, the latter are easily sprung out far enough to release the lugs, and the blade is then turned on its pivot *a* far enough to bring another desired set of holes into position to embrace the lugs *b*.

In Fig. 1 the blade is shown in a proper position for ordinary weeding purposes, and in Fig. 2 it is shown adjusted to about the same angle as an ordinary hoe, in which position it can be used for cultivating plants and drawing the earth to them. The construction of the blade with the side plates renders it particularly adaptable for this latter function, since it can hold more earth than an ordinary hoe.

It is obvious that instead of having the branching arms E F the hoe-head might be constructed with solid side arms, on which both the lugs *a* and *b* could be formed; but the construction with the skeleton arms E F is preferred, since the head is thus rendered lighter, and at the same time presents a more ornamental appearance and does not carry earth upon it. It is only essential that the head should form a support to which the hoe-blade may be pivoted at its sides, and at the same time that it may be formed with locking-lugs, by which the blade may be locked in different angular positions.

Having thus described our invention, what we claim as new, and desire to secure by Letters Patent, is—

1. A hoe-head having branching arms and a cutting-blade pivoted thereto, in combination with clasping devices, whereby the blade is held at different angles, substantially as described.

2. A hoe-head having branching arms, in combination with a cutting-blade pivoted at its sides to said branching arms and adjustably secured thereto by apertures in said blade and lugs upon said branching arms, substantially as described.

3. A hoe-head having two sets of branching arms provided with projecting lugs, in combination with a cutting-blade having side plates at its ends, which are pivoted to said branching arms, said side plates being provided with a series of apertures which are adapted to embrace said lugs, substantially as set forth.

4. A hoe-head having branching arms provided with projecting lugs $a$ and $b$, in combination with a cutting-blade having bent-up side plates at its ends, said side plates being pivoted to the lugs $a$, and formed with a series of apertures which engage the lugs $b$, substantially as set forth.

5. A hoe-head, B, having two sets of branching arms, E F, each outer arm E being formed at its lower end with a pivoting-lug, $a$, and each inner arm F being formed at its lower end with a locking-lug, $b$, in combination with a flat cutting-blade, C, having bent-up side plates, G G, at its ends, said side plates being pivoted to the lugs $a$, and being formed with a series of apertures, $c$, which engage the locking-lugs $b$, substantially as set forth.

6. A hoe-head having two sets of branching arms, in combination with a cutting-blade adjustably pivoted thereto, substantially as described.

In testimony whereof we affix our signatures in presence of two witnesses.

SANFORD C. PITNEY.
JOSEPH ASH.

Witnesses:
JOHN J. SIEPKER,
WILLIAM BARBOUR.